(12) United States Patent
Eguchi et al.

(10) Patent No.: US 9,759,819 B2
(45) Date of Patent: Sep. 12, 2017

(54) RADIATION MEASUREMENT DEVICE

(71) Applicant: Mitsubishi Electric Corporation, Chiyoda-ku, Tokyo (JP)

(72) Inventors: Kazuhiro Eguchi, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 56 days.

(21) Appl. No.: 14/892,969

(22) PCT Filed: Dec. 16, 2013

(86) PCT No.: PCT/JP2013/083558
§ 371 (c)(1),
(2) Date: Nov. 20, 2015

(87) PCT Pub. No.: WO2015/019515
PCT Pub. Date: Feb. 12, 2015

(65) Prior Publication Data
US 2016/0109586 A1 Apr. 21, 2016

(30) Foreign Application Priority Data
Aug. 8, 2013 (JP) .................................. 2013-164697

(51) Int. Cl.
*G01T 1/02* (2006.01)
*G01T 1/20* (2006.01)
*G01T 1/40* (2006.01)
(52) U.S. Cl.
CPC .............. *G01T 1/2006* (2013.01); *G01T 1/02* (2013.01); *G01T 1/40* (2013.01)
(58) Field of Classification Search
CPC ............ G01T 1/02; G01T 1/2006; G01T 1/40
See application file for complete search history.

(56) References Cited

U.S. PATENT DOCUMENTS

| 4,973,913 A | 11/1990 | Oda |
| 2009/0080612 A1* | 3/2009 | Hikida ...................... G01T 1/18 378/82 |
| 2011/0101234 A1 | 5/2011 | Nakamura et al. |

FOREIGN PATENT DOCUMENTS

| EP | 2290405 A1 | 3/2011 |
| JP | 04-084795 A | 3/1992 |

(Continued)

OTHER PUBLICATIONS

Takigami, Mokoto, et al. Machine translation of the description for JP 06-008862 B, corresponding to JP 04-084795 A.*

(Continued)

*Primary Examiner* — Mark R Gaworecki
(74) *Attorney, Agent, or Firm* — Buchanan Ingersoll & Rooney PC (57) ABSTRACT

In a radiation measurement device in which respective wave height values of voltage pulses from a radiation detector are made to correspond to radiation energy values and a count that is the number of the voltage pulses is separately generated for each of a plurality of channels corresponding to the wave height values so that a wave height spectrum is generated and a dose of a radiation that has entered the radiation detector is calculated based on the wave height spectrum, based on a count in at least one channel, out of the plurality of channels, that includes a lower limit within a measurement range for the radiation energy value, a dose is corrected by calculating a portion thereof neglected as what is the same as or smaller than a measurement limit, so that a dose of a radiation that has entered the radiation detector is calculated.

6 Claims, 10 Drawing Sheets

(56) References Cited

FOREIGN PATENT DOCUMENTS

| JP | 04084795 A | * | 3/1992 |
|----|------------|---|--------|
| JP | 5-002080 A |   | 1/1993 |
| JP | H09-033660 A | | 2/1997 |
| JP | 2000-292544 A | | 10/2000 |
| JP | 2005-249580 A | | 9/2005 |
| JP | 2006-029986 A | | 2/2006 |
| JP | 2009-175042 A | | 8/2009 |

OTHER PUBLICATIONS

Extended European Search Report dated Jan. 12, 2017 issued in corresponding European Patent Appln. No. 13890918.9 (11 pages).
International Search Report (PCT/ISA/210) mailed on Mar. 11, 2014, by the Japanese Patent Office as the International Searching Authority for International Application No. PCT/JP2013/083558.

* cited by examiner

| RESOLUTION R (%) | CORRECTION COEFFICIENTS K |
|---|---|
| $R_{s-10}$ | $K_{s-10}$ |
| $R_{s-9}$ | $K_{s-9}$ |
| ⋮ | ⋮ |
| $R_s$ | $K_s$ |
| ⋮ | ⋮ |
| $R_{s+9}$ | $K_{s+9}$ |
| $R_{s+10}$ | $K_{s+10}$ |

RADIATION MEASUREMENT DEVICE

FIELD OF THE INVENTION

The present invention relates to a radiation measurement device that is installed in a facility such as a nuclear reactor plant or a spent fuel reprocessing plant or installed in the vicinity thereof and that measures and controls a radiation dose per unit time such as a dose rate or a dose equivalent rate.

BACKGROUND ART

A radiation measurement device is configured with a radiation detector and a measurement unit; when a radiation enters the radiation detector, the radiation detector outputs an analogue pulse with a wave height corresponding to the energy of the incident radiation. The radiation detector of a radiation measurement device installed in the vicinity of a facility such as a nuclear reactor plant or a spent fuel reprocessing plant needs to measure a radiation dose corresponding to the environmental background level of several tens nGy/h or several tens nSv/h. Accordingly, as the radiation detector, a NaI(Tl) scintillation detector or a CsI(Tl) scintillation detector is utilized; the measurement range thereof is from 10 nGy/h to 10 μGy/h or 10 nSv/h to 10 μSv/h and the detection sensitivity thereof is high.

Each of these scintillation detectors outputs an analogue pulse with a wave height in proportion to the energy of an incident radiation. The measurement unit thereof receives the analogue pulse and outputs a wave height spectrum every preset constant time, while allocating the wave heights of the analogue pulse to respective channels, the number of which is preliminarily set. Radiation energy values are allocated to the respective channels for the wave height spectra, the energy values are weighted with doses (dose equivalent quantities), and the weighted energy value is multiplied by the count of the channel so that the dose (dose equivalent quantity) for each channel is obtained. Counting is performed with regard to the channels within an energy range to be measured so that the counted dose (dose equivalent) is obtained; then, the counted dose (dose equivalent) is integrated for the measurement time so that the integral dose (dose equivalent) is obtained. Furthermore, the integral dose (dose equivalent) is divided by the measurement time, so that the dose rate (dose equivalent rate) is outputted. The wave height spectrum is measured and the dose (dose equivalent) is weighted in accordance with the wave height, i.e., the energy of a radiation, so that the energy characteristic of the output dose (dose equivalent) is compensated (for example, Patent Document 1).

In contrast, in a facility such as a nuclear reactor plant or a spent fuel reprocessing plant, as the radiation detector, a Si-semiconductor radiation detector that, as an area monitor having the measurement range of 1 μSv/h to $10^5$ μSv/h, can cover a wide range is utilized. A Si-semiconductor radiation detector is typified, for example, a Si-PIN photodiode. A bias voltage, a reverse voltage, is applied to a Si-PIN photodiode; an electron and a hole that are produced, for example, from a γ-ray that entered a depletion layer (I layer) are collected, respectively, by a cathode electrode (N-layer) to which a positive voltage is applied and by an anode electrode (P layer) to which a negative voltage is applied. A preamplifier converts an analogue pulse current into an analogue pulse voltage; then, the radiation detector outputs the analogue pulse voltage. In a Si-semiconductor radiation detector, the counting rate sensitivity to a dose (dose equivalent) depends on the energy of an incident γ-ray; the detection efficiency is in inverse proportion to the energy and varies by approximately 1 digit within a common measurement energy range for a γ-ray, i.e., the range from 50 keV to 3000 keV. Therefore, in some radiation measurement devices, the sensitivity to low energy is lowered by a physical filter so as to match the sensitivity to high energy, so that the counting rate sensitivity to a dose (dose equivalent) is flattened (for example, Patent Document 2).

PRIOR ART REFERENCE

Patent Document

[Patent Document 1] Japanese Patent Application Laid-Open No. 2009-175042 (FIGS. 1 and 2)
[Patent Document 2] Japanese Patent Application Laid-Open No. H05-2080 (FIG. 3)

DISCLOSURE OF THE INVENTION

Problems to be Solved by the Invention

A scintillation detector has a spectrum-peak spread in its detection output, in order to deal with total absorption of radiation energy. In the case where the peak of a wave height spectrum exists in the vicinity of the lower limit of the measurement energy range, the fringe portion of the spectrum-peak spread lies out of the lower limit of the measurement energy range; thus, some portion of the spectrum does not contribute to the measurement value. Accordingly, in some cases, the measurement output becomes several tens percent lower than the reference at the lower-energy portion thereof; thus, there has been a problem that at the lower-energy portion, the accuracy is deteriorated.

Moreover, the energy resolution of a scintillation detector varies depending on the type of the scintillator, the manufacturer of the detector, and the differences among the detectors. Furthermore, the energy characteristic of a Si-semiconductor radiation detector also varies depending on the manufacturer of the detector and the differences among the detectors. As described above, the characteristics of radiation measurement devices differ from one another depending on the type of the detector, the manufacturer, and the like; thus, there has been a problem that a method of evenly compensating energy leaves a distortion in the energy characteristic and the distortion cannot be compensated.

The present invention has been implemented in order to solve the foregoing problems; the objective thereof is to obtain a high-accuracy radiation measurement device that is simply configured and has an excellent energy characteristic.

Means for Solving the Problems

The present invention is characterized in that in a radiation measurement device in which respective wave height values of voltage pulses from a radiation detector are made to correspond to radiation energy values and a count that is the number of the voltage pulses is separately generated for each of a plurality of channels corresponding to the wave height values so that a wave height spectrum is generated and a dose of a radiation that has entered the radiation detector is calculated based on the wave height spectrum, based on a count in at least one channel, out of the plurality of channels, that includes a lower limit within a measurement range for the radiation energy value, a dose is corrected by calculating a portion thereof neglected as what is the same as or smaller than a measurement limit, so that a dose of a radiation that has entered the radiation detector is calculated.

Advantage of the Invention

The present invention makes it possible to obtain a high-accuracy radiation measurement device that is simply configured and has an excellent energy characteristic.

EMBODIMENTS FOR CARRYING OUT THE INVENTION

Embodiment 1

Figure 1:
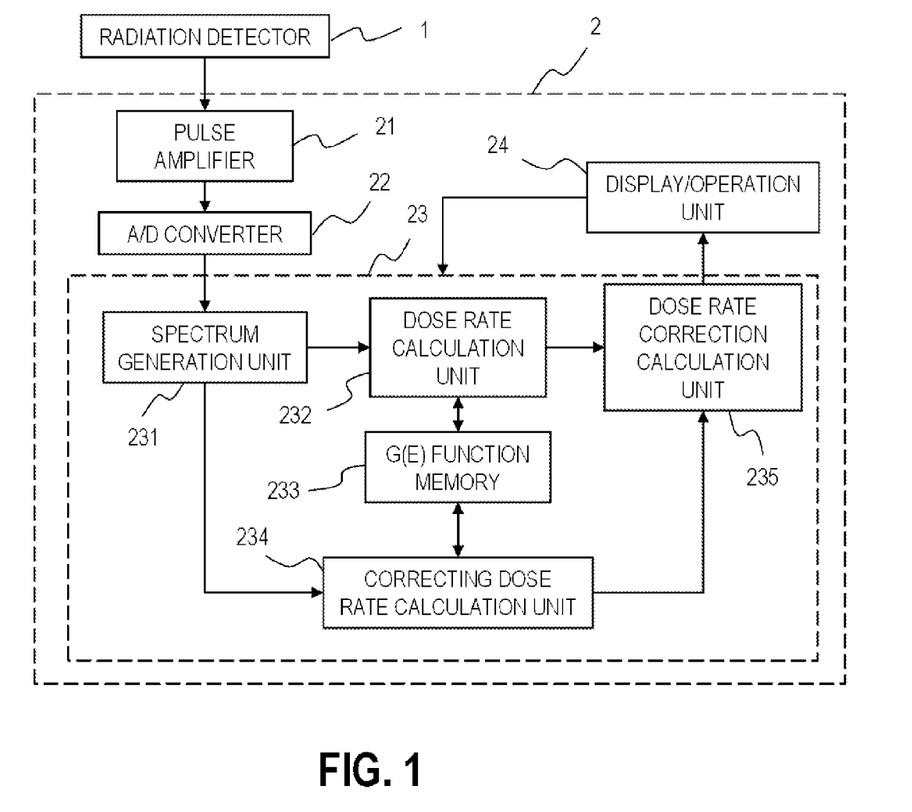
FIG. 1 is a block diagram illustrating the configuration of a radiation measurement device according to Embodiment 1 of the present invention.

FIG. 1 is a block diagram illustrating the configuration of a radiation measurement device according to Embodiment 1 of the present invention. A radiation detector 1 is a scintillation detector that is provided with a scintillator for converting energy given by a radiation into fluorescence and that converts the fluorescence into an electron and multiplies the electron so that the fluorescence is converted into an analogue current pulse. The scintillation detector further converts the analogue current pulse into an analogue voltage pulse and outputs the analogue voltage pulse. In general, as the scintillation detector, for example, a NaI(Tl) scintillation detector provided with a NaI(Tl) crystal or a CsI(Tl) scintillation detector provided with a CsI(Tl) crystal is utilized.

A measurement unit 2 receives the analogue voltage pulse outputted from the radiation detector 1, converts it into a radiation dose per unit time such a dose rate or a dose equivalent rate, and outputs it. Hereinafter, the explanation will be made by use of a dose rate as the radiation dose per unit time; however, in the present application, a dose rate includes a dose equivalent rate. The measurement unit 2 is provided with a pulse amplifier 21, an analogue/digital converter (A/D converter) 22, a calculation unit 23, and a display/operation unit 24. The calculation unit 23 is provided with a spectrum generation unit 231, a dose rate calculation unit 232, a G(E) function memory 233, a correcting dose rate calculation unit 234, and a dose rate correction calculation unit 235.

The pulse amplifier 21 receives and amplifies the analogue voltage pulse form the radiation detector 1. The A/D converter 22 measures the wave height values of analogue voltage pulses, in the amplified analogue voltage pulse train, whose voltage peak values, i.e., the wave height values are the same as or larger than a value set as a noise cutting level, and outputs wave height data.

The spectrum generation unit 231 receives wave height data, which is the data on the wave height values of the voltage pulses outputted from the A/D converter 22, and generates a wave height spectrum every preset constant time interval, for example, every one minute. The wave height value corresponds to the energy of a radiation. For example, it is assumed that the wave height values 0 v to 3 v corresponds to the radiation energy values 0 keV to 3000 keV. In this case, the range of wave height values 0 v to 3 v is divided into 600 sections; then, the counting number (count), which is the number of voltage pulses having the wave height corresponding to each of 600 channels, is created in each channel. The set of the counting numbers generated in the respective channels is referred to as a wave height spectrum. In other words, the wave height spectrum corresponds to the energy spectrum of a radiation that enters the radiation detector every 1 constant time.

The dose rate calculation unit 232 allocates the wave height spectrum generated by the spectrum generation unit 231 to the radiation energy in the G(E) function memory 233, weights the energy of each channel with a dose, and multiplies the weighted energy by the count of each channel so as to obtain the dose for each channel. The respective doses obtained for the channels are counted with respect to the measurement-subject energy range, for example, with respect to the channels 10 ch to 600 ch corresponding to 50 keV to 3000 keV, so that a counted dose is obtained. The counted dose is integrated for the measurement time so that the integral dose is obtained; then, the integral dose is divided by the measurement time so that the dose rate is obtained.

In a manner similar to the way in which the dose rate calculation unit 232 obtains the dose rate, the correcting dose rate calculation unit 234 obtains the correcting dose rate with respect to the energy range, including the lower limit value within the measurement energy range, in which the energy characteristic needs to be corrected. The dose rate correction calculation unit 235 multiplies the correcting dose rate obtained by the correcting dose rate calculation unit 234 by a correction coefficient Ks, obtained based on the standard resolution value Rs of the scintillation detector 1 or experimentally obtained, so that the dose rate correction amount is obtained; then, the dose rate correction calculation unit 235 obtains the corrected dose rate by adding the dose rate correction amount to the dose rate and outputs it. The display/operation unit 24 displays the corrected dose rate and sets the measurement unit 2 by use of, for example, a touch panel.

Figure 2:
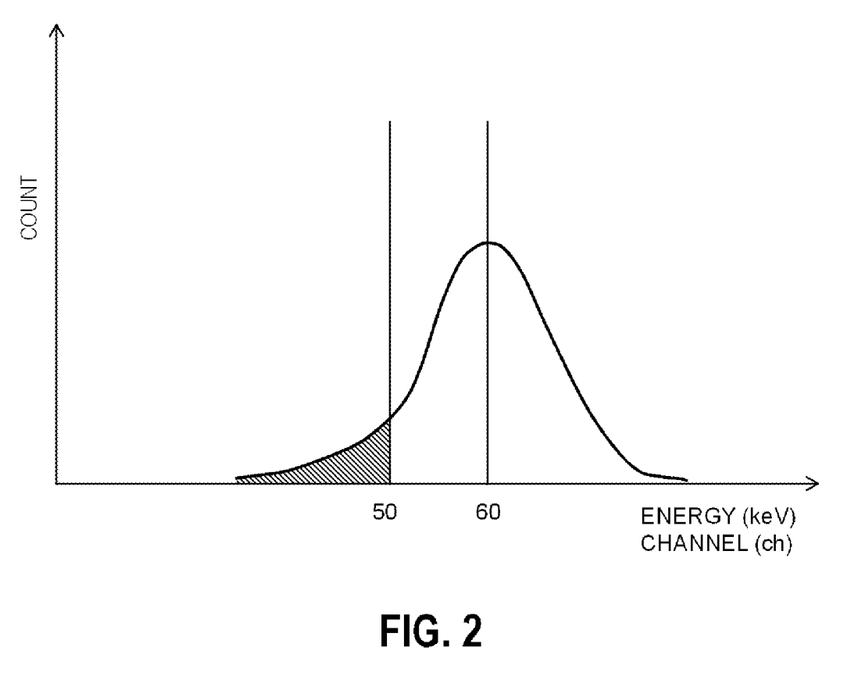
FIG. 2 is a graph for explaining correction in a radiation measurement device according to Embodiment 1 of the present invention.

Here, how to obtain the dose rate correction amount will be explained. FIG. 2 is a graph for explaining the energy resolution (also referred to simply as a resolution) of the radiation detector 1 and the correction amount at a time when the energy of a radiation is 60 keV, which is close to the lower limit 50 keV of the measurement energy. In FIG. 2, the solid line represents the differential-pulse wave height distribution in the radiation detector 1 at a time when a radiation having single energy of 60 keV is irradiated onto the radiation detector 1. The resolution R is defined as the quotient of the energy half-value width of the distribution curve divided by the energy value of the wave height portion. In FIG. 2, in a conventional measurement, the energy amount that is distributed at the energy lower limit 50 keV or lower and is indicated by the hatching is neglected as what is the same as or smaller than the measurement limit and is not reflected in the measurement value. In the present invention, the dose rate that is neglected as what is the same as or smaller than the measurement limit is calculated so that the dose rate is corrected.

In the case of a scintillation detector, when a radiation having single energy, for example, a γ-ray of Cs-137 having single energy of 662 keV enters the detector, a Gaussian-distribution photoelectric peak spectrum emerges in the channel corresponding to 662 keV, due to photoelectric absorption. Although due to Compton absorption, a Compton edge and a trapezoidal spectrum connecting therewith emerge with a spread in the channels to which the lower energy is allocated, the count distributed at the measurement energy lower limit 50 keV or lower is negligible with respect to the whole count. In contrast, in the case where the single energy is as low as 60 keV, 90% or more than 90% of the radiation forms a photoelectric peak spectrum; as represented in FIG. 2, the tail thereof is distributed with a non-negligible ratio at the measurement energy lower limit 50 keV or lower.

Letting Ep (keV), Ew (keV), σ, and R (%) denote the peak energy (the energy corresponding to the peak counting position in the optoelectronic peak spectrum), the half-value width (the energy width corresponding to the half of the peak count), the standard deviation, and the resolution, respectively, the relationship among them is given by the following equations.

$$R(\%)=100(\%) \times Ew/Ep \quad (1)$$

$$\text{Deviation from the center}=2.35\sigma \times (Ep-50)/Ew \quad (2)$$

The resolution is inverse proportional to the square root of the energy of a radiation; therefore, in the case where it is assumed that the resolution reference is the resolution initial value 8% of a γ-ray of Cs-137 having energy of 662 keV and Ep denotes the representative energy of an energy range to be corrected, the resolution Rs (%) at the energy Ep is given by the following equation.

$$Rs=8 \times (662/Ep)^{1/2} \quad (3)$$

The resolution at the reference energy 662 keV of a γ-ray of Cs-137 will be referred to as a standard resolution.

For example, in the case where it is assumed that the energy range to be corrected is from 50 keV to 70 keV and the representative energy Ep of the energy range is 60 keV, the equation (3) gives 26.6% as Rs. Based on this Rs, the deviation 1.46σ is obtained from the equations (1) and (2). Based on a normal distribution table, the ratio of the spectrum portion of 50 keV (corresponding to the deviation 1.46σ) or smaller to the whole spectrum becomes approximately 7%, and then the correction coefficient Ks of 0.07 is obtained.

In the foregoing explanation, the correction coefficient Ks has been obtained through a calculation; however, the correction coefficient Ks can also be obtained based on an actually measured spectrum, which is measured by irradiating an X-ray of 60 keV onto the radiation detector 1.

In the foregoing explanation, the resolution Rs has been set based on the representative energy of the energy range to be corrected; however, it goes without saying that in the case where a plurality of energy ranges, for example, 50 keV through 70 keV and 70 keV through 90 keV are to be corrected, the energy characteristics can further be improved by obtaining the respective resolutions Rs for the representative energy values of the energy ranges and implementing the correction. As described above, the present invention is characterized in that the energy characteristic is corrected by calculating the dose neglected as what is the same as or smaller than the measurement limit, based on the count in at least one channel including the lower limit in the radiation energy measurement range, and then the dose of a radiation that has entered the radiation detector is calculated.

Figure 3:
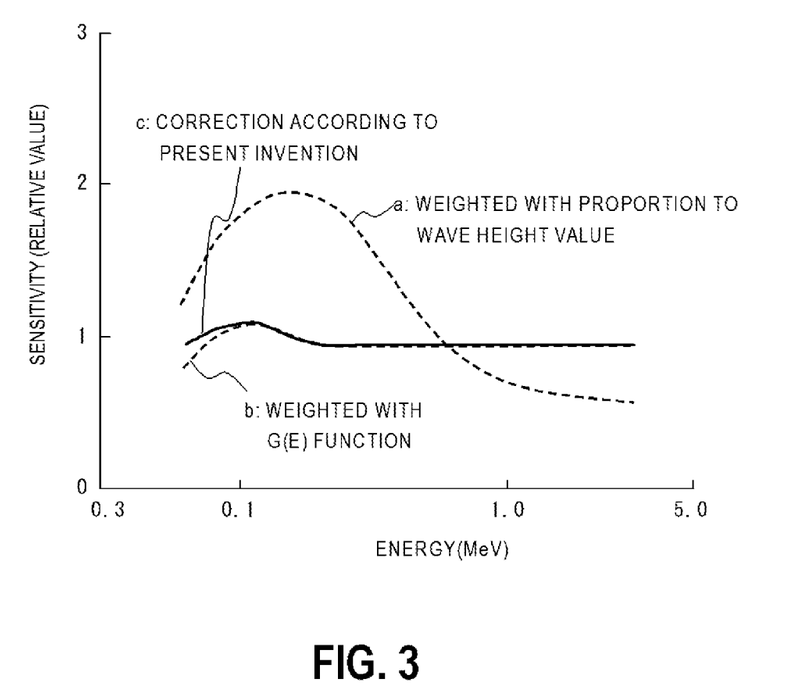
FIG. 3 is a graph for explaining the energy characteristic of a radiation measurement device according to Embodiment 1 of the present invention.

FIG. 3 is a graph for explaining the energy characteristic of a radiation measurement device according to Embodiment 1 of the present invention. Curve "a" is the energy characteristic of a dose rate, obtained under the assumption that the dose is simply in proportion to the wave height value; curve "b" is the energy characteristic of a dose rate, obtained by being weighted with the G(E) function; curve "c" is the energy characteristic of a dose rate, to which the correction according to Embodiment 1 has been applied. As can be seen from curve "c" in FIG. 3, the correction according to the present invention largely improves the characteristic in the vicinity of the measurement energy lower limit.

As described above, in Embodiment 1, the measurement unit 2 firstly obtains a dose rate to be obtained from measured wave height data and the correcting dose rate for an energy range, including the lower limit in the measurement range, whose energy characteristic is to be corrected. Next, the dose rate correction amount is obtained by multiplying the obtained correcting dose rate by the correction coefficient Ks set based on the resolution Rs of the scintillation detector 1. This dose rate correction amount is added to the dose rate so that the corrected dose rate is outputted. As described above, in Embodiment 1, the energy characteristic is corrected by calculating the dose neglected as what is the same as or smaller than the measurement limit; therefore, a high-accuracy radiation measurement device having an excellent energy characteristic can be provided.

Embodiment 2

Figure 4:
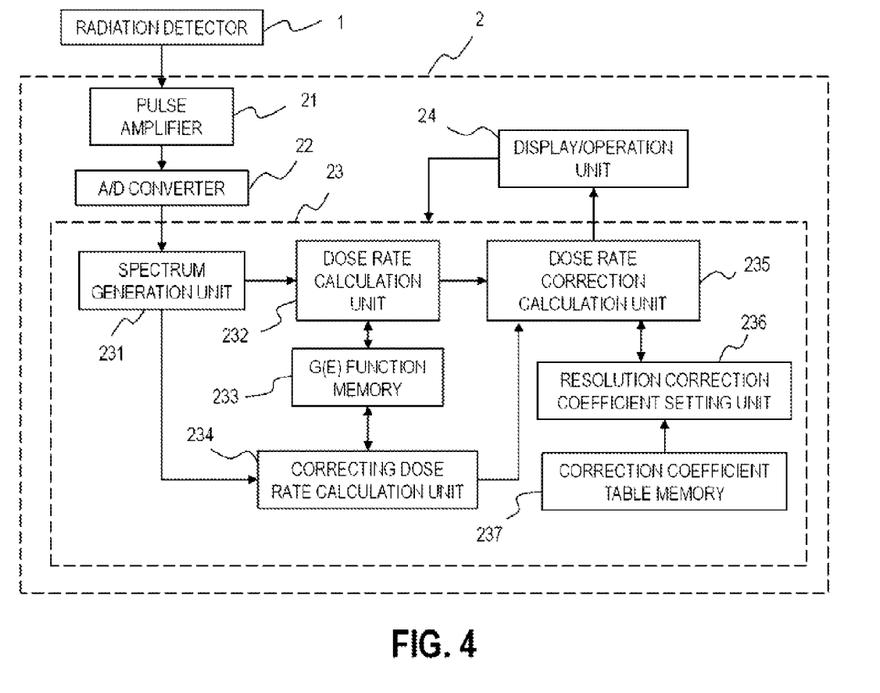
FIG. 4 is a block diagram illustrating the configuration of a radiation measurement device according to Embodiment 2 of the present invention.

FIG. 4 is a block diagram illustrating the configuration of a radiation measurement device according to Embodiment 2 of the present invention. In Embodiment 1, the dose rate correction calculation unit 235 utilizes the correction coefficient Ks calculated or experimentally obtained based on the initial value of the standard resolution of a scintillation detector as the radiation detector 1. In Embodiment 2, as illustrated in FIG. 4, a resolution correction coefficient setting unit 236 and a correction coefficient table memory 237 are provided, and the dose rate correction calculation unit 235 performs the correction by use of a correction coefficient set by the resolution correction coefficient setting unit 236.

Figure 5:
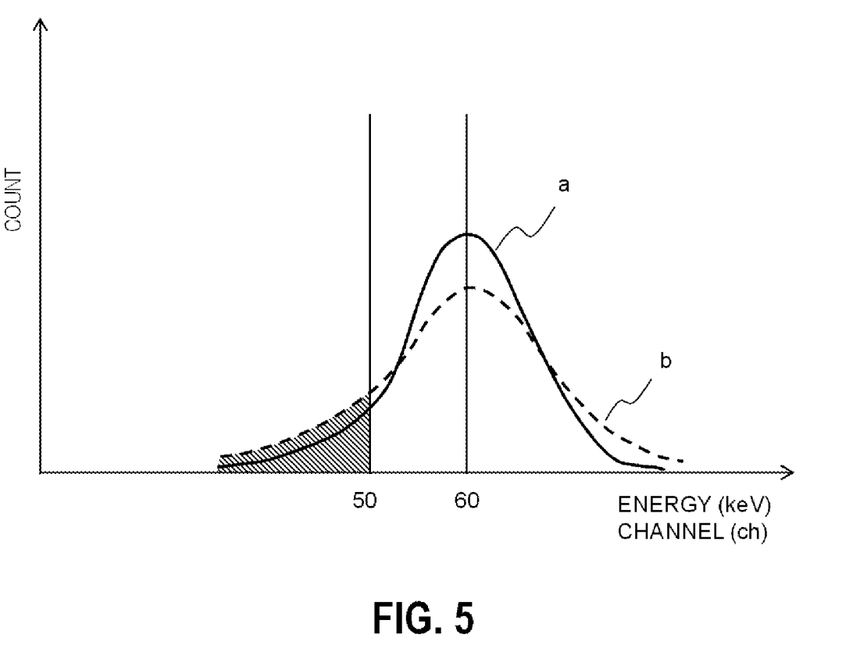
FIG. 5 is a graph for explaining correction in a radiation measurement device according to Embodiment 2 of the present invention.

A radiation detector is deteriorated with use, and the resolution thereof decreases. The solid line "a" in FIG. 5 represents a distribution curve at a time when as explained with reference to FIG. 2 of Embodiment 1, the initial value of the standard resolution of the radiation detector 1, which is newly provided, is 8%. In contrast, the broken line "b" represents a distribution curve at a time when the radiation detector 1 has been deteriorated after long-time use and the standard resolution thereof has decreased to 10%. In the case of the distribution curve represented by the broken line "b", the amount, indicated by the hatching in FIG. 5, that is distributed at the energy lower limit 50 keV or lower is neglected as what is the same as or smaller than the measurement limit and is not reflected in the measurement value; thus, by correcting this amount, the accuracy is further raised. As explained in Embodiment 1, when the standard resolution is 8%, the equation (3) gives 26.6% as the resolution Rs at Ep=60 keV. The correction coefficient for this resolution is 0.07. When the standard resolution is 10%, the equation (3) gives 32.2% as the resolution Rs at Ep=60 keV. The correction coefficient for this resolution is calculated to be 0.12 through the equations (1) and (2).

Figure 6:
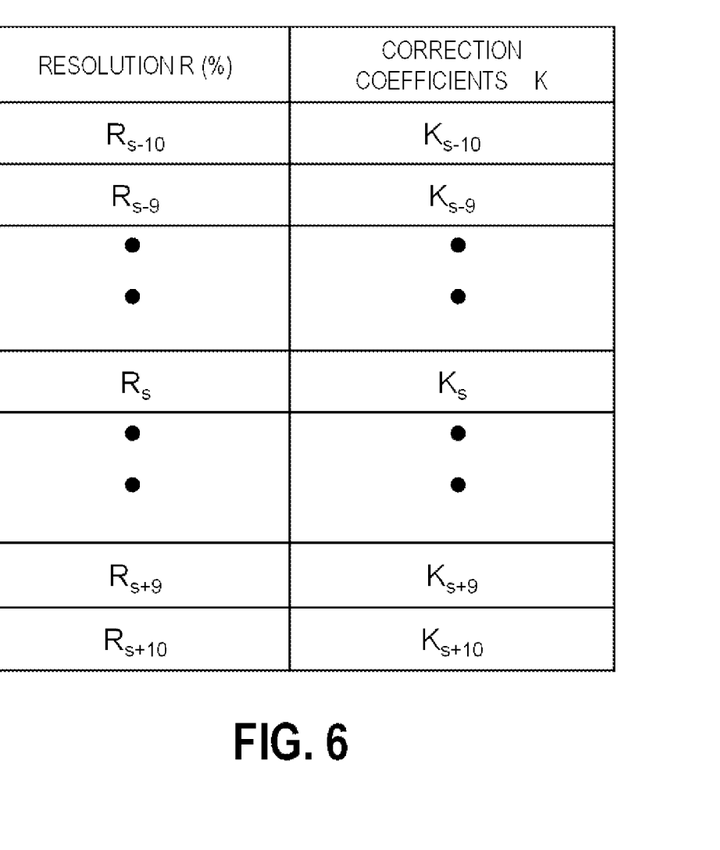
FIG. 6 represents an example of correction coefficient table for a radiation measurement device according to Embodiment 2 of the present invention.

In Embodiment 2, the correction coefficient is set in accordance with a resolution change in use or differences among the resolutions of the detectors. For that purpose, the respective correction coefficients K for different standard resolutions R are preliminarily obtained through calculations or experiments and are stored, as a correction coefficient table represented in FIG. 6, in the correction coefficient table memory 237. The resolution correction coefficient setting unit 236 sets the standard resolution for single-unit testing data or periodic testing data of the radiation detector 1 and then collates the set standard resolution with the corresponding correction coefficient K in the correction coefficient table memory 237 so as to set the correction coefficient. The dose rate correction calculation unit 235 obtains the dose rate correction amount by multiplying the correcting dose rate obtained by the correcting dose rate calculation unit 234 by this correction coefficient K, and then outputs the corrected dose rate obtained by adding the dose rate correction amount to the dose rate obtained by the dose rate calculation unit 232. The foregoing configuration makes it possible to absorb differences among the resolutions of detectors or deterioration of the resolution and to perform an accurate correction.

Embodiment 3

Figure 7:
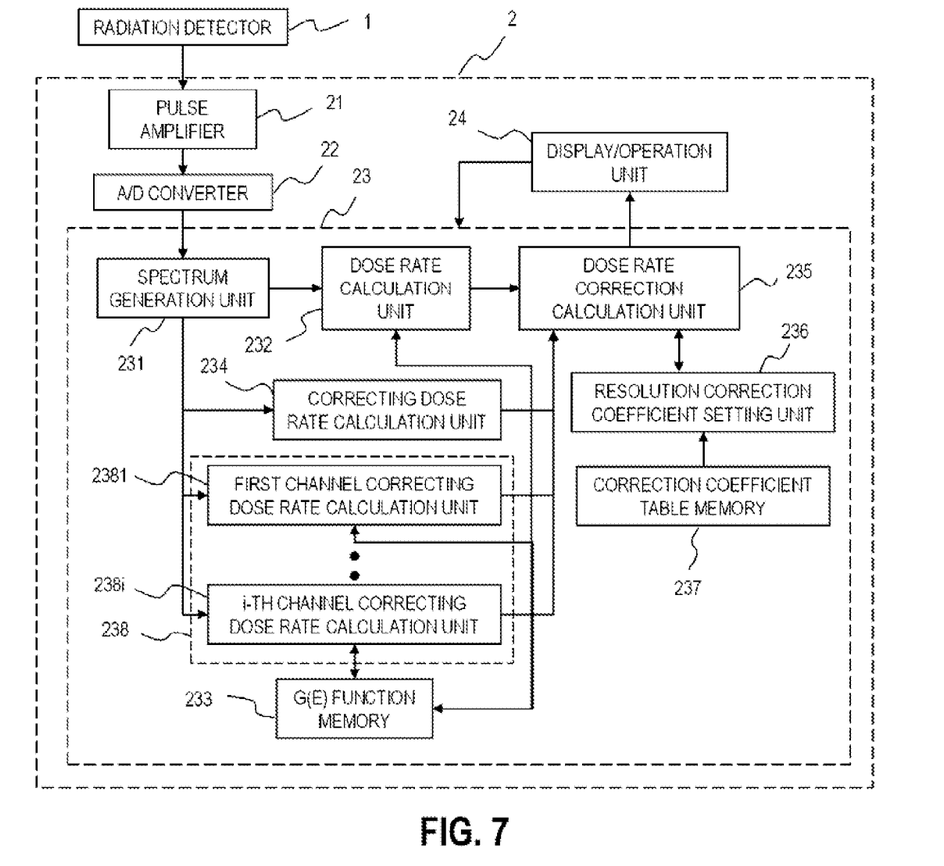
FIG. 7 is a block diagram illustrating the configuration of a radiation measurement device according to Embodiment 3 of the present invention.

FIG. 7 is a block diagram illustrating the configuration of a radiation measurement device according to Embodiment 3 of the present invention. In each of Embodiments 1 and 2, the output correction is applied only to the energy-characteristic portion where the characteristic thereof is distorted due to neglecting the spectrum portion at the measurement-channel lower limit or lower and due to the resolution. In Embodiment 3, a channel correcting dose rate calculation unit 238 is provided in addition to the correcting dose rate calculation unit 234 for correcting an energy-characteristic distortion caused by neglecting the spectrum portion at the measurement channel lower limit or lower. FIG. 7 illustrates an device in which the channel correcting dose rate calculation unit 238 is added to Embodiment 2, i.e., the radiation measurement device in FIG. 4; however, the channel correcting dose rate calculation unit 238 may be added to Embodiment 1, i.e., the radiation measurement device in FIG. 1.

The channel correcting dose rate calculation unit 238 calculates a correcting dose rate for correcting the energy-characteristic distortion caused by variations in the linearity of the wave height of an analogue pulse outputted from the radiation detector 1 in response to the energy of a radiation. When the total number of channels having an energy-characteristic distortion to be corrected is "i" (i: an integer that is "1" or larger), the channel correcting dose rate calculation unit 238 is configured with the first through i-th channel correcting dose rate calculation units 2381 through 238i. In each of the first through i-th channel correcting dose rate calculation units 2381 through 238i, the dose rates of the channels to be corrected are measured and the measured dose rates are multiplied by respective preliminarily set correction coefficients K1 through KI, so that the dose rate correction amounts are calculated. In the dose rate correction calculation unit 235, the dose rate obtained by the dose rate calculation unit 232 is corrected in such a way that the correction, for the measurement channel lower limit or lower, that is obtained by the correcting dose rate calculation unit 234 and the correction obtained by the channel correcting dose rate calculation unit 238 are added to said dose rare obtained by the dose rate calculation unit 232. As described above, in Embodiment 3, the energy-characteristic distortion of a radiation detector is corrected based on the count of at least one channel in the radiation energy measurement range, and then the dose of a radiation that enters the radiation detector is calculated; therefore, even when a distortion exists in the energy characteristic of the radiation detector 1, a radiation measurement device having an excellent energy characteristic can be obtained.

Embodiment 4

Figure 8:
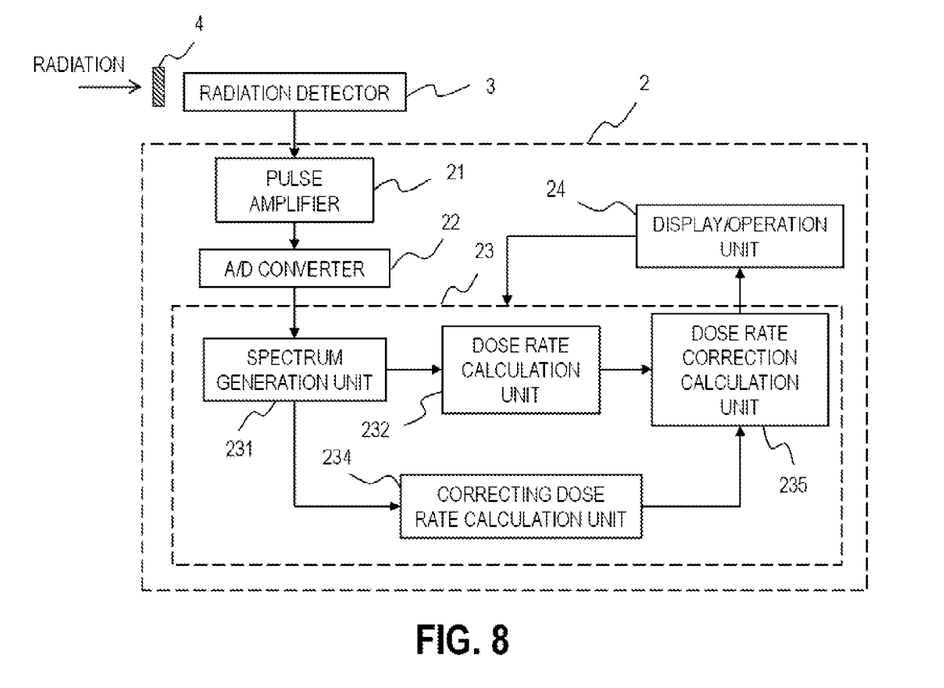
FIG. 8 is a block diagram illustrating the configuration of a radiation measurement device according to Embodiment 4 of the present invention.

FIG. 8 is a block diagram illustrating the configuration of a radiation measurement device according to Embodiment 4 of the present invention. In Embodiment 1, as the radiation detector 1, a scintillation detector is provided, and the calculation unit 23 weights the wave height value of spectrum data with a G(E) function so as to obtain the dose rate. In Embodiment 4, as the radiation detector 3, there is provided a semiconductor radiation detector in which the positive electrode and the negative electrode collect electrons and holes, respectively, produced by the energy given by a radiation, the electrons and the holes are converted into an analogue current pulse, and the analogue current pulse is converted into an analogue voltage pulse and then is outputted. As is the same with a scintillation detector, the radiation detector 3, which is a semiconductor radiation detector, outputs an analogue pulse with a wave height corresponding to the energy given by an incident radiation. The incident face of the semiconductor radiation detector is provided with a physical filter 4 having such an energy characteristic as the radiation transmittance decreases in proportion to the reduction of the energy. The provision of the physical filter 4 flattens the energy characteristic, which is the relationship between the dose rate and the counting rate for the analogue voltage pulse that falls within the measurement range, so that the energy characteristic does not depend on the energy of a radiation. For example, when as the physical filter 4, a stainless steel sheet having a thickness of 1.5 mm to 2.5 mm is utilized, the energy characteristic can mostly be flattened.

The operation of the spectrum generation unit 231 of the calculation unit 23 is the same as that of the spectrum generation unit 231 of the calculation unit 23 in Embodiment 1; therefore, explanation therefor will be omitted. The dose rate calculation unit 232 counts doses so as to obtain the counted dose, with respect to the measurement-subject energy range corresponding to the wave height spectrum generated by the spectrum generation unit 231, for example, the channels 10 ch through 600 ch corresponding to 50 keV through 3000 keV; then, the dose rate calculation unit 232 integrates the counted dose for the measurement time so as to obtain the integral dose and then divides the integral dose by the measurement time so as to obtain the dose rate.

As is the same with the dose rate calculation unit 232, the correcting dose rate calculation unit 234 measures the dose rate in the channel range, to be corrected, including the lower limit value within the measurement channel range, i.e., the correcting dose rate. The dose rate correction calculation unit 235 multiplies the correcting dose rate obtained by the correcting dose rate calculation unit 234 by the experimentally obtained correction coefficient K so as to obtain the dose rate correction amount. The dose rate correction calculation unit 235 adds the dose rate correction amount to the dose rate obtained by the dose rate calculation unit 232 so as to obtain the corrected dose rate. The display/operation unit 24 displays the corrected dose rate obtained by the dose rate correction calculation unit 235. The display/operation unit 24 can perform setting for the measurement unit 2, by providing, for example, a touch panel.

Figure 9:
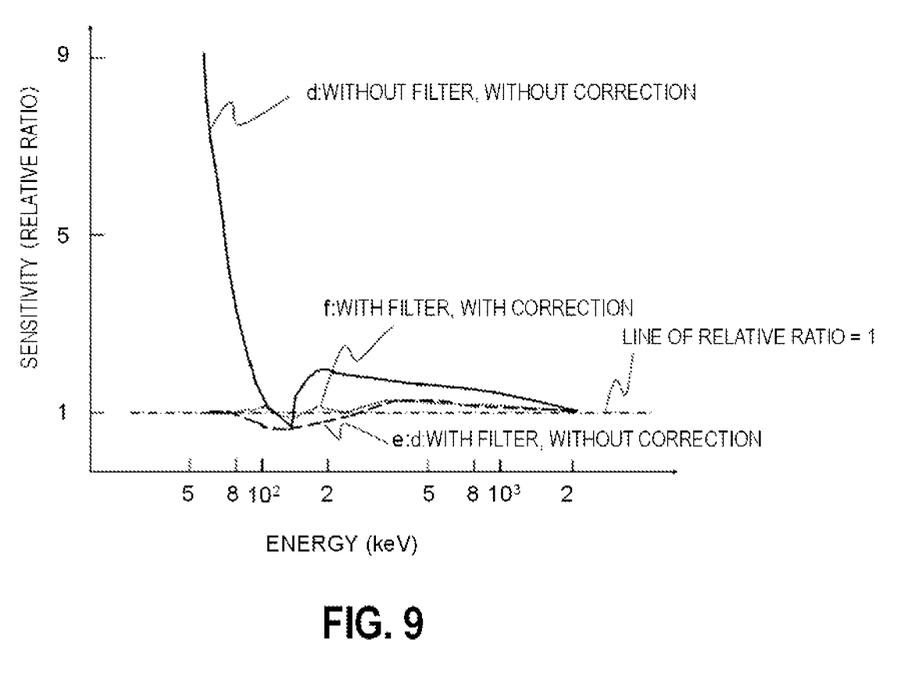
FIG. 9 is a graph for explaining the energy characteristic of a radiation measurement device according to Embodiment 4 of the present invention.

FIG. 9 is a graph representing the energy characteristic of a radiation measurement device in which as the radiation detector, a semiconductor radiation detector is utilized. Curve "d" represents the sensitivity relative ratio (the relative sensitivity to Cs-137 of 0.66 MeV is "1") at a time when the physical filter 4 is not provided; curve "e" represents the sensitivity relative ratio at a time when the physical filter 4 is provided and the correction according to Embodiment 4 is not performed); curve "f" represents the characteristic at a time when the physical filter 4 is provided and the correction according to Embodiment 4 is performed). The correction according to Embodiment 4 largely improves the characteristic in the vicinity of the measurement energy lower limit.

As described above, in Embodiment 4, as the radiation detector, a semiconductor radiation detector is provided; the measurement unit 2 firstly obtains a dose rate to be obtained from measured wave height data and the correcting dose rate for an energy range, including the lower limit in the measurement range, whose energy characteristic is to be corrected. Next, the obtained correcting dose rate is multiplied by the experimentally obtained correction coefficient so that the dose rate correction amount is obtained. This dose rate correction amount is added to the dose rate so that the corrected dose rate is outputted. As described above, in Embodiment 4, an energy-characteristic partial distortion, caused by neglecting the spectrum portion in the vicinity of the lower limit in the measurement subject energy range, is compensated; therefore, as is the case with a scintillation detector, the semiconductor radiation detector makes it possible to provide a high-accuracy radiation measurement device having an excellent energy characteristic.

Embodiment 5

Figure 10:
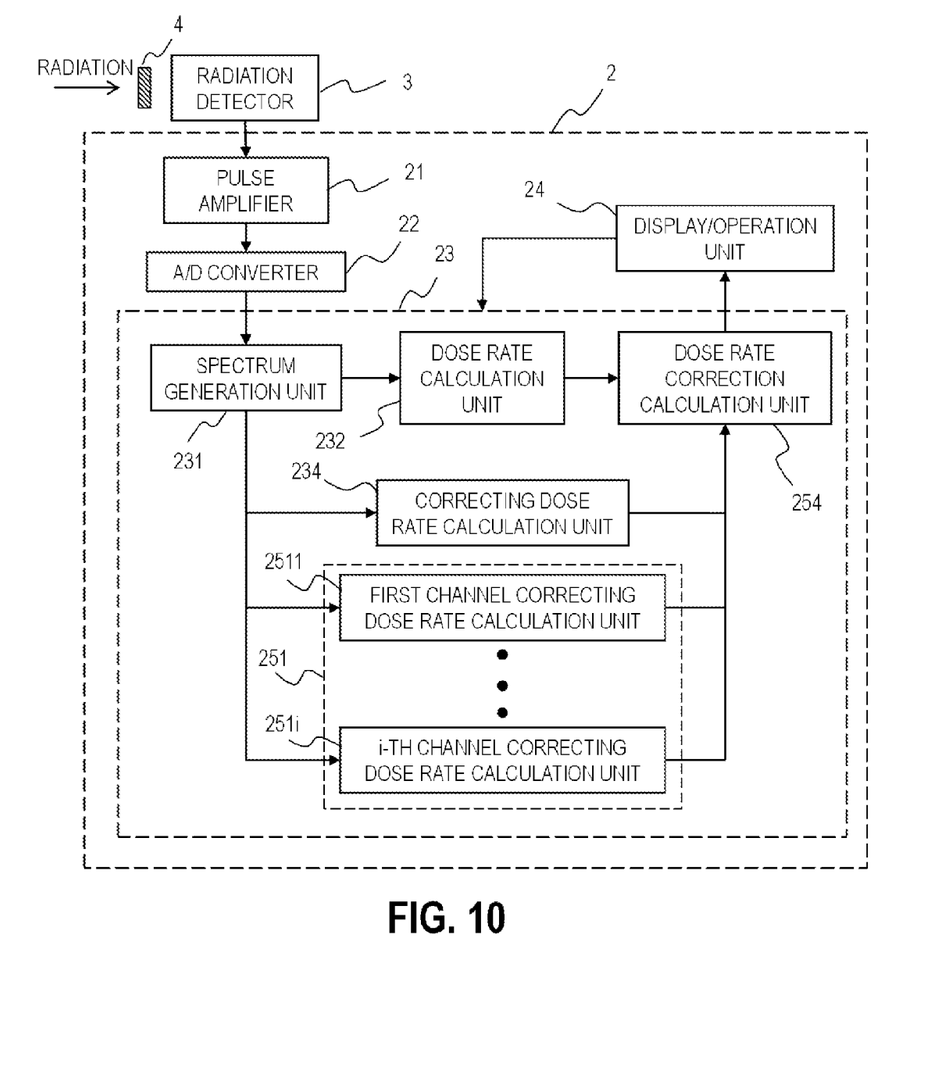
FIG. 10 is a block diagram illustrating the configuration of a radiation measurement device according to Embodiment 5 of the present invention.

FIG. 10 is a block diagram illustrating the configuration of a radiation measurement device according to Embodiment 5 of the present invention. In Embodiments 4, as is the case with each of Embodiments 1 and 2, the output correction is applied only to the energy-characteristic portion where the characteristic thereof is distorted due to neglecting the spectrum portion at the measurement-channel lower limit or lower. In Embodiment 5, as illustrated in FIG. 10, in addition to the correcting dose rate calculation unit 234, a channel correcting dose rate calculation unit 251 is provided, as is the case with Embodiment 3. The correcting dose rate calculation unit 234 implements the same function as that of the correcting dose rate calculation unit 234 in Embodiment 4, i.e., implements the correction of an energy-characteristic distortion caused by neglecting the spectrum portion at the lower limit or lower in the measurement channel.

The channel correcting dose rate calculation unit 251 is configured with a first channel correcting dose rate calculation unit 2511 through an i-th channel correcting dose rate calculation unit 251$i$. The channel correcting dose rate calculation unit 251 corrects the portion, of the characteristic of the radiation detector 3, that cannot be compensated by the physical filter 4, i.e., performs correction for compensating a distortion in the compensation by the physical filter 4. At least one of the first through i-th channel correcting dose rate calculation units 2511 through 251$i$ measures the dose rate to be corrected and the measured dose rates are multiplied by respective correction coefficients K1 through Ki that are preliminarily set based on those measured doses, so that the dose rate correction amount is calculated and correction is implemented. In Embodiment 5, correction is applied also to a compensation distortion caused by the physical filter 4; therefore, a radiation measurement device having a more excellent energy characteristic can be obtained.

Various modifications and alterations of this invention will be apparent to those skilled in the art without departing from the scope and spirit of this invention, and it should be understood that this is not limited to the illustrative embodiments set forth herein.

1,3 radiation detector
2 measurement unit
4 physical filter
23 calculation unit
231 spectrum generation unit
232 dose rate calculation unit
234 correcting dose rate calculation unit
235 dose rate correction calculation unit

The invention claimed is:

1. A radiation measurement device comprising a calculation unit in which respective wave height values of voltage pulses from a radiation detector are made to correspond to radiation energy values and a count that is the number of the voltage pulses is separately generated for each of a plurality of channels corresponding to the wave height values so that a wave height spectrum is generated and a dose of a radiation that has entered the radiation detector is calculated based on the wave height spectrum, wherein the calculation unit, based on a count in at least one channel, out of the plurality of channels, that includes a lower limit within a measurement range for the radiation energy value, and based on an energy resolution of the radiation detector, corrects a dose by calculating a portion thereof neglected as what is the same as or smaller than a measurement limit, so as to calculate a dose of a radiation that has entered the radiation detector, wherein the dose of the radiation to be calculated is a dose rate that is a dose per unit time.

2. The radiation measurement device according to claim 1, wherein the calculation unit comprises:
a spectrum generation unit that generates the wave height spectrum;
a dose rate calculation unit that calculates a dose in the radiation energy value corresponding to each of the channels, based on a count generated in each channel by the spectrum generation unit, that integrates the calculated dose for the whole measurement range for the radiation energy value so as to obtain an integral dose, and that divides the integral dose by a measurement time so as to obtain a dose rate;

a correcting dose rate calculation unit that calculates a dose neglected as what is the same as a measurement limit or smaller, based on a count in at least one channel that includes the lower limit within a measurement range for the radiation energy value, out of counts generated in the respective channels by the spectrum generation unit, and based on the energy resolution of the radiation detector, obtains a correcting dose rate, that is a dose per unit time, from the calculated dose; and a dose rate correction calculation unit that corrects the dose rate obtained by the dose rate calculation unit, by use of the correcting dose rate obtained by the correcting dose rate calculation unit, and that calculates a dose rate of a radiation that has entered the radiation detector.

3. The radiation measurement device according to claim 1, wherein the radiation detector is a scintillation detector.

4. The radiation measurement device according to claim 1, wherein the calculation unit, based on a count in at least one channel within the measurement range for the radiation energy value, corrects a distortion in an energy characteristic of the radiation detector caused by variations in the linearity of the wave height in response to the energy of a radiation so as to calculate a dose of a radiation that has entered the radiation detector.

5. The radiation measurement device according to claim 1, wherein the radiation detector is a semiconductor radiation detector.

6. The radiation measurement device according to claim 5, wherein a radiation enters the radiation detector through a physical filter for compensating an energy characteristic of the radiation detector.

* * * * *